United States Patent
Black et al.

(10) Patent No.: US 6,246,885 B1
(45) Date of Patent: *Jun. 12, 2001

(54) DIGITAL FM AUDIO PROCESSING IN A DUAL-MODE COMMUNICATION SYSTEM

(75) Inventors: Peter J. Black, La Jolla; Randeep Singh, San Francisco; Way-Shing Lee, La Jolla; Henry Chang, San Diego, all of CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/095,859

(22) Filed: Jun. 11, 1998

Related U.S. Application Data

(63) Continuation of application No. 08/593,303, filed on Jan. 31, 1996, now Pat. No. 6,006,108.

(51) Int. Cl.[7] .................................................. H04B 1/38
(52) U.S. Cl. ................................... 455/553; 704/227
(58) Field of Search .................................. 455/550, 552, 455/553, 575, 34, 84, 561; 704/200, 201, 226, 227

(56) References Cited

U.S. PATENT DOCUMENTS

| | | | |
|---|---|---|---|
| 4,725,972 | * | 2/1988 | Hirano et al. .................. 375/245 |
| 4,779,262 | * | 10/1988 | Avis et al. ...................... 455/561 |
| 5,163,159 | * | 11/1992 | Rich et al. ....................... 455/74 |
| 5,251,232 | * | 10/1993 | Nonami et al. .................. 455/84 |
| 5,295,178 | * | 3/1994 | Nickel et al. .................. 455/561 |
| 5,299,228 | * | 3/1994 | Hall ................................ 370/330 |
| 5,404,579 | * | 4/1995 | Obayashi et al. .............. 455/503 |
| 5,436,955 | * | 7/1995 | Kaewell, Jr. et al. ........ 455/553 |
| 5,550,893 | * | 8/1996 | Heidari ........................... 455/553 |
| 5,564,076 | * | 10/1996 | Auvray .......................... 455/553 |
| 5,657,351 | * | 8/1997 | Mullins et al. ................. 375/244 |

\* cited by examiner

*Primary Examiner*—Edward F. Urban
(74) *Attorney, Agent, or Firm*—Philip Wadsworth; Charles D. Brown; Tom Streeter

(57) ABSTRACT

A novel and improved digital FM audio processor for use in a dual-mode communication system selectively operative in either FM or code division multiple access (CDMA) modes. Analog voice or voice-band data is input to a speech encoder/decoder (CODEC) which converts the analog signal to a digital signal. The digital FM signal is read from the CODEC, filtered, compressed, up-sampled and combined with a transponded SAT signal and then modulated for RF transmission. On the receive side, the FM analog signal is received, demodulated, down-sampled, expanded, and filtered before being converted to the proper format ($\mu$-law, a-law, or linear) for the speech CODEC. The CODEC then converts the digital FM audio signal into an analog waveform for conversion to sound. By performing the FM audio processing digitally, the same digital signal processing (DSP) firmware may integrated on the same application specific integrated circuit (ASIC) which is capable of performing audio processing of both FM and CDMA audio signals.

12 Claims, 6 Drawing Sheets

DIGITAL FM AUDIO PROCESSING IN A DUAL-MODE COMMUNICATION SYSTEM

This application is a continuation of application Ser. No. 08/593,303, filed Jan. 31, 1996, now U.S. Pat. No. 6,006, 108.

BACKGROUND OF THE INVENTION

I. Field of the Invention

The present invention relates generally to frequency modulated (FM) communication systems. More particularly, the present invention relates to novel and improved digital FM audio processing in a dual-mode communication system selectively operative in either FM or code division multiple access (CDMA) modes.

II. Description of the Related Art

There are presently multiple types of cellular radiotelephone systems operating. These systems include the frequency modulated (FM) advanced mobile phone system (AMPS) and two digital cellular systems: time division multiple access (TDMA and GSM), and code division multiple access (CDMA). The digital cellular systems are being implemented to handle capacity problems that AMPS is experiencing. Dual-mode CDMA/FM radiotelephones exist which are selectively operative in either FM or CDMA modes. Telecommunications Industry Association (TIA)/Electronic Industries Association (EIA) Interim Standard 95, entitled "Mobile Station-Base Station Compatibility Standard for Dual-Mode Wideband Spread Spectrum Cellular System" sets forth the requirements and standards for a dual-mode radiotelephones which is selectively operative in either FM or CDMA modes.

In an FM communication system as dictated by IS-95, the base station and the radiotelephone communicate a supervisory audio tone (SAT) during the duration of the call. The base station transmits the SAT to the radiotelephone, and the radiotelephone must detect and transpond, or return, the same SAT to the base station in order to keep the call in progress connected. Should the radiotelephone fail to detect and or transpond the proper SAT back to the base station the call would be dropped. There are three different frequencies for the SAT, 5.97 kHz, 6 kHz, or 6.03 kHz. Each base station in a given area will transmit the SAT on a different frequency. The SAT is transmitted as an analog FM signal, and so is conveniently processed in tandem with the FM voice signal.

In a typical dual-mode radiotelephone, the audio processing of FM communication signals is performed using analog signal processing techniques, and the audio processing of the digital communication signals is performed using digital signal processing techniques. Thus, the FM and CDMA audio processing paths have traditionally used separate circuits with separate components. For example, several integrated circuits are commercially available which perform analog FM audio signal processing. Likewise, several designs exist for digital signal processing of CDMA audio. However, using separate circuits for the FM and the CDMA audio processing adds cost, weight and size to the radiotelephone. What is needed is a means of performing FM audio processing digitally in order to utilize the same circuitry for both FM and CDMA audio processing.

SUMMARY OF THE INVENTION

The present invention is a novel and improved digital FM audio processor for use in a dual-mode communication system selectively operative in either FM or code division multiple access (CDMA) modes. Analog voice or voice-band data is input to a speech encoder/decoder (CODEC) which converts the analog signal to a digital signal. Optionally, the digital signal may be a pulse code modulated (PCM) FM audio signal in either $\mu$-law, a-law, or linear format. The digital FM signal is read from the CODEC, filtered, compressed, up-sampled and combined with a transponded SAT signal and then further up-sampled, gain adjusted, FM modulated and transmitted on an RF frequency. On the receive side, the FM analog signal is received, downconverted, converted to a digital sample, FM demodulated, down-sampled, expanded, and filtered before being converted to the proper format ($\mu$-law, a-law, or linear) for the speech CODEC. The CODEC then converts the digital FM audio signal into an analog waveform for conversion to sound.

By performing the FM audio processing digitally, the same digital signal processing (DSP) firmware may integrated on the same application specific integrated circuit (ASIC) which is capable of performing audio processing of both FM and CDMA audio signals.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Overview of the Digital FM Communication System

Figure 1:
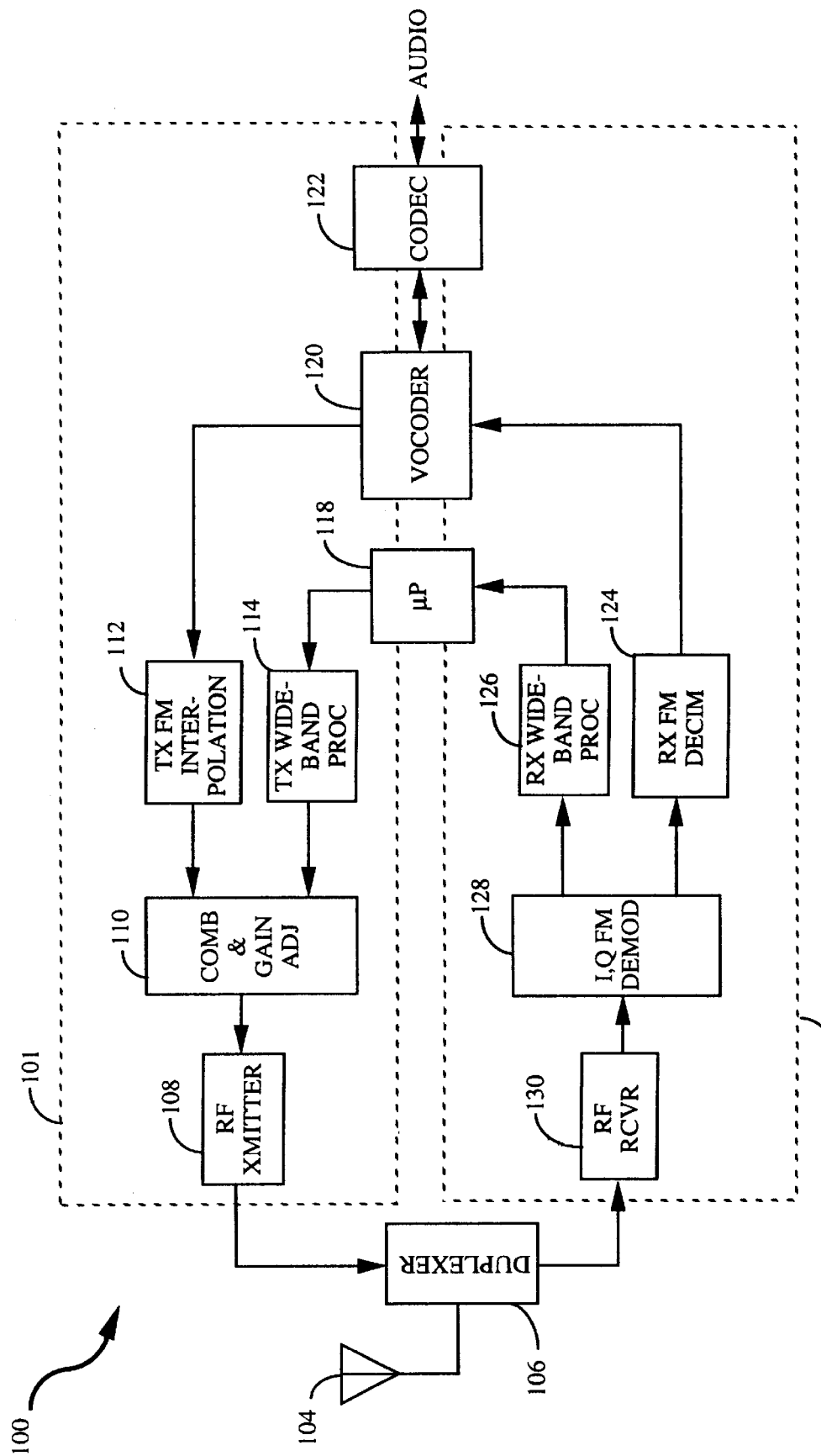
FIG. 1 is an illustrative representation of a digital FM communication system in accordance with the present invention.

FIG. 1 provides an illustrative representation of a digital FM communication system 100 in accordance with the present invention. Such a communication system is described in detail in U.S. patent application Ser. No. 08/373,122, entitled "Dual-Mode Digital FM Communication System", assigned to the assignee of the present invention and incorporated herein by reference. The digital FM communication system 100 includes an FM transmit path 101 and an FM receive path 102.

In FM receive path 102, the received analog radio frequency (RF) analog FM signal is received by antenna 104, and passed to RF receiver 130. through duplexer 106. In RF receiver 130, the received analog FM signal is downconverted to digital in-phase (I) and quadrature (Q) baseband signals. The digital I and Q baseband signals are passed to I, Q FM demodulator 128, where frequency demodulation occurs. Following demodulation, the frequency signal is passed to RX wideband data processor 126, as well as to RX FM decimator 124. In RX wideband data processor 126, the frequency signal is decoded and error corrected, producing control messages which are passed to microprocessor 118. In RX FM decimator 124, the frequency signal is downsampled from an exemplary rate of 40 kilosamples/second (ks/s) to 20 ks/s and passed to vocoder 120 for RX audio and SAT processing. In the preferred embodiment of the present invention, the FM audio processing in the "audio" band is implemented in the processing functions of the vocoder 120 digital signal processor (DSP) core. Vocoder 120 performs audio processing and SAT detection and regeneration, and passes the resulting PCM signal to CODEC 122 at an exemplary rate of 8 ks/s for further conversion to an analog audio speech waveform.

In FM transmit path 101, CODEC 122 converts an analog audio speech waveform to PCM samples, and passes the PCM signal to vocoder 120 at an exemplary rate of 8 ks/s. Vocoder 120 performs digital FM audio processing on the incoming PCM signal, and combines the digital FM audio signal with the SAT signal that is regenerated from FM receive path 102. The combined digital FM audio/SAT signal is passed to TX FM interpolator 112 at an exemplary rate of 20 ks/s where it up-sampled to an exemplary rate of 40 ks/s. At the same time, the wideband data message flows from microprocessor 118 to TX wideband data processor 114 where wideband data waveform generation occurs. The up-sampled audio signal from TX FM interpolator 112 and the wideband data waveform from TX wideband data processor 114 are combined and gain adjusted in combiner and gain adjuster 110. The resultant signal is passed to RF transmitter 108 for frequency modulation and upconversion, and ultimately transmitted by antenna 104 through duplexer 106.

Figure 2:
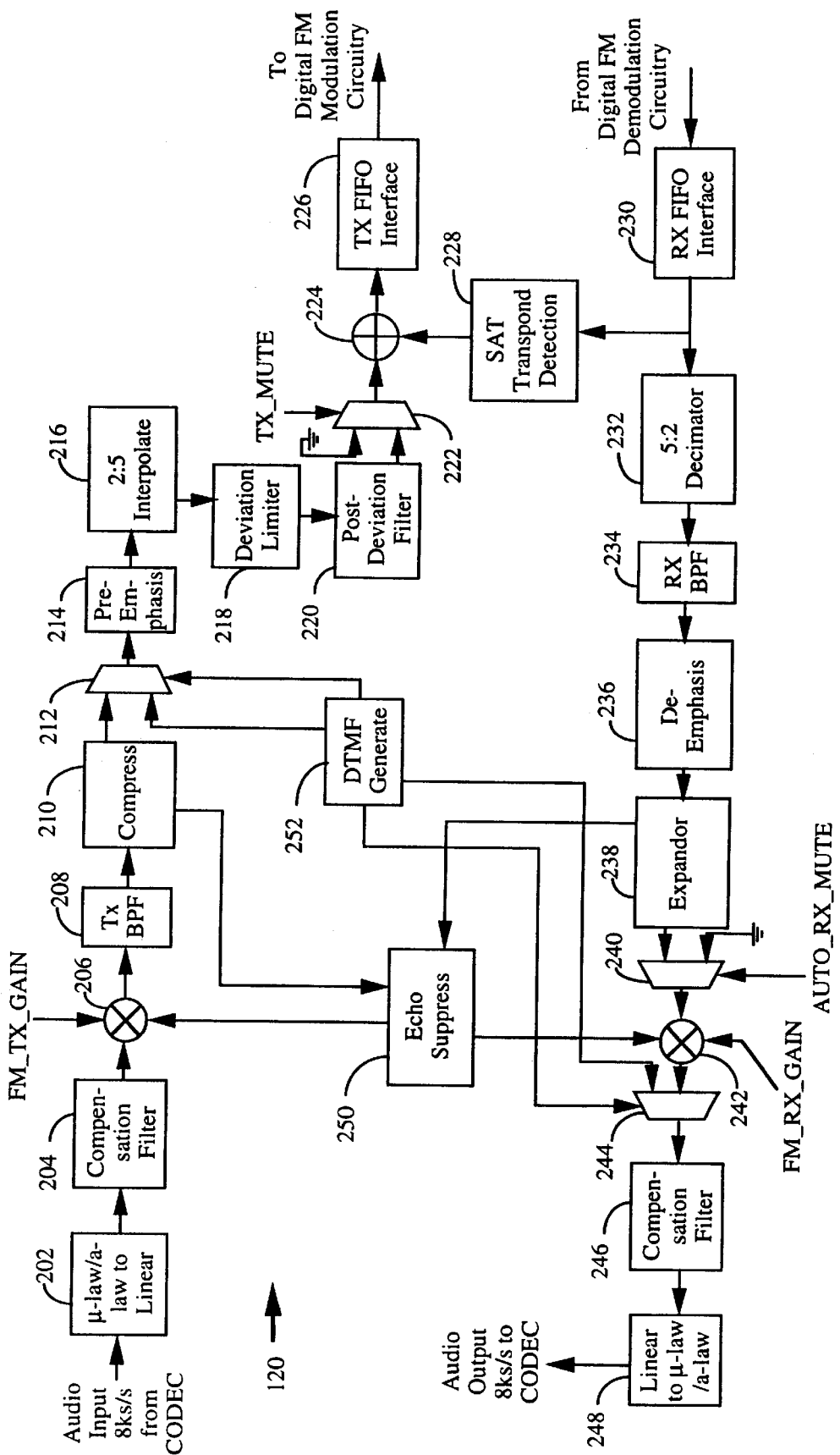
FIG. 2 is a logical block diagram of the preferred embodiment of the FM audio processing apparatus of the present invention.

A high-level block diagram of vocoder 120 processing functions is shown in FIG. 2 In the preferred embodiment, two sample rates are utilized for the digital FM signal processing: 8 ks/s for interfacing with the audio CODEC 122, and 20 ks/s for interfacing with the,; RX FM decimator 124 and TX FM interpolator 112, and for processing of the SAT signal.

II. FM TX Audio Processing

The audio input is sampled/quantized via a standard 8 ks/s audio CODEC 122. Turning to FIG. 2, a linear expander 202 provides support for μ-law/a-law CODECs 122 (FIG. 1), the input from which is converted to a linear data format before audio processing. CODEC 122 (FIG. 1) may also be a linear CODEC, not using μ-law or a-law companding to limit the dynamic range of the audio input, in which case linear expander 202 may be bypassed. In the preferred embodiment, linear expander 202 is implemented for code-excited linear prediction (CELP). For details of a linear expander 202 which utilizes CELP, see U.S. patent application Ser. No. 08/197,417, entitled "Vocoder ASIC" and assigned to the assignee of the present invention and incorporated herein by reference.

The linear signal is passed to TX compensation filter 204 which may be used for equalization of the TX path audio frequency response. Components of the overall frequency response which may require equalization include: the microphone (not shown), mechanical housing (not shown) and FM modulator (not shown) frequency responses. In the preferred embodiment, TX compensation filter 204 is a fourteen tap even length, even symmetric, linear phase FIR filter, operating at 8 ks/s, with a transfer function of:

$$H(z) = \sum_{n=0}^{6} c[n] \times (z^{-n} + z^{-(13-n)})$$

where C[n] is the n-th tap coefficient.

TX gain adjust element 206 provides an optional gain adjustment for final calibration of the CODEC 122 (see FIG. 1) interface signal levels. In the preferred embodiment, TX gain adjust element 206 is a digital multiplier which provides +/−12 dB gain range settable via a FM_TX_GAIN signal to match the nominal voice level signal from CODEC 122 to compressor 210. TX gain adjust element 206 also provides TX gain adjustment for use with voice-activated (VOX) echo suppressor 250, which may be used in conjunction with a "hands-free" operation of the communication device, similar to that of a typical speaker phone, in order to prevent the undesirable echoes that may occur during simultaneous talk/listen when in a speakerphone mode. The operation of echo, suppressor 250 is described further below.

TX bandpass filter 208 band-limits the audio input, suppressing high and low frequency noise, while preserving the voice-frequency band. In the preferred embodiment, the audio input is band-limited to the nominal audio bandwidth of 300 Hz to 3 kHz. In the preferred embodiment, TX bandpass filter 208 is a 6th order butterworth bandpass filter, 3dB bandwidth 200 Hz to 3.4 kHz with at least a 24 dB/octave roll-off below 300 Hz.

Figure 3:
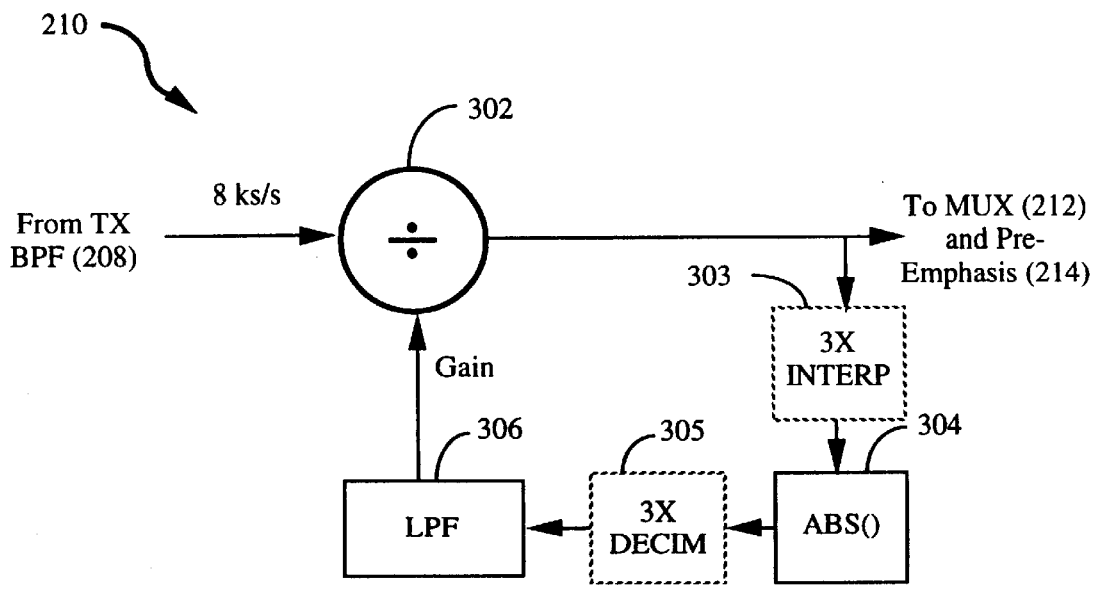
FIG. 3 is a logical block diagram of the transmit compressor of the present invention.

Compressor 210 compresses the audio signal for more efficient use of the transmit frequency bandwidth. A typical input audio signal may have a dynamic range of 60 dB. When translated into the frequency domain, this large dynamic energy range would require a wide bandwidth to transmit. In the preferred embodiment, compressor 210 implements a 2:1 syllabic compandor in digital firmware as is well known in the art. Thus, audio input signals with a dynamic range of 60 dB will be compressed to −30 dB. The preferred embodiment of compressor 210 is shown in FIG. 3. In FIG. 3, a band-limited 8 ks/s audio signal is passed to compressor 210, which comprises divider 302, absolute value calculator 304, and low-pass filter 306. In operation, absolute value calculator 304 measures the absolute value of the signal energy input to compressor 210, and generates a feedback signal which is low-pass filtered by low-pass filter 306 and divided out in divider 302 from the input signal. Operation of the feedback loop is such that the output signal level changes by 1dB for each 2dB change of input level. The resultant compressed signal is then passed to multiplexer 212 (see FIG. 2). In the preferred embodiment, low-pass filter 306 has a transfer function of:

$$H(z) = \frac{K_c a z^{-1}}{1 - (1-a)z^{-1}}.$$

In the preferred embodiment the compressor 210 time constant is 20 ms, yielding attack and decay times of 3 ms and 13.5 ms, respectively. Using an over-sampled approximation, the loop time constant is given by τ=(1/fs)/a, hence for a sample rate fs of 8 ks/s, the filter coefficient a =0.00625. The compressor 210 0 dB reference (i.e. unity gain) is set by the scale factor Kc. Optionally, absolute value calculator 304 may be preceded by an 3× interpolator 303, and followed by a 3× decimator 305. 3× interpolator 303 up-samples the data from 8 ks/s to 24 ks/s, and 3× decimator 305 performs the complementary down-sampling from 24 ks/s to 8 ks/s. By utilizing interpolation in this manner, one can avoid phase dependent energy estimates. For example, interpolation by 3× reduces the variation in signal level estimation performed by absolute value calculator 304 from 0.69 dB to 0.078 dB for a 1 kHz tone. To avoid a potential divide by zero error in divider 302, in the preferred embodiment the lower limit for the divider is −24 dB or $2^{-4}$ units (normalized).

Referring again to FIG. 2, multiplexer 212 selectively provides either the compressed FM audio from compressor 210, or generated dual-tone multifrequency (DTMF) tones from DTMF generator 252 to pre-emphasis element 214. DTMF tones are well known in the art and provide signaling by the simultaneous transmission of two tones, one from a group of high frequencies, and another from a group of low frequencies. When a user desires to transmit DTMF tones, for example to remotely activate a telephone answering system, DTMF generator 252 generates the appropriate tones, and switches multiplexer 212 to insert the DTMF tones in the transmit path.

Pre-emphasis element 214 of the audio band signal is used to compensate for the high frequency enhanced (colored) noise spectrum at the FM demodulator 128 (see FIG. 1) output. In the preferred embodiment, pre-emphasis element 214 is a 1st order infinite impulse response (IIR) high-pass filter with a transfer function of:

$$H(z) = \frac{k(1 + b_1 z^{-1})}{(1 + a_1 z^{-1})};$$

where k=1.53386, $b_1$ =−1 and $a_1$=0.23. This produces +6 dB/octave over the band 300 Hz to 3 kHz with a nominal 0 dB reference at 1 kHz. Using an IIR instead of a simple 2-tap FIR differentiator avoids high frequency droop given the low sample rate (8 ks/s) relative to the upper frequency bound (3 kHz).

The input sample rate of 8 ks/s is sufficient for audio processing, but must be increased to at least 12 ks/s (nyquist rate) for inclusion of the 6 kHz SAT signal. A higher sample rate is also desirable for implementation of deviation limiter 218 (described below), to minimize the margin required for peak values which don't necessarily coincide with the discrete sample points. In the preferred embodiment, a sample rate of 20 ks/s is used for all higher rate processing. An over sample ratio of 1.67 for SAT is adequate and since 20 ks/s is a convenient input sample rate from the FM demodulator 128 (through decimator 124, see FIG. 1), the RX/TX processing is symmetric and the vocoder RX/TX interfaces are matched in terms of sample rates.

Figure 4:
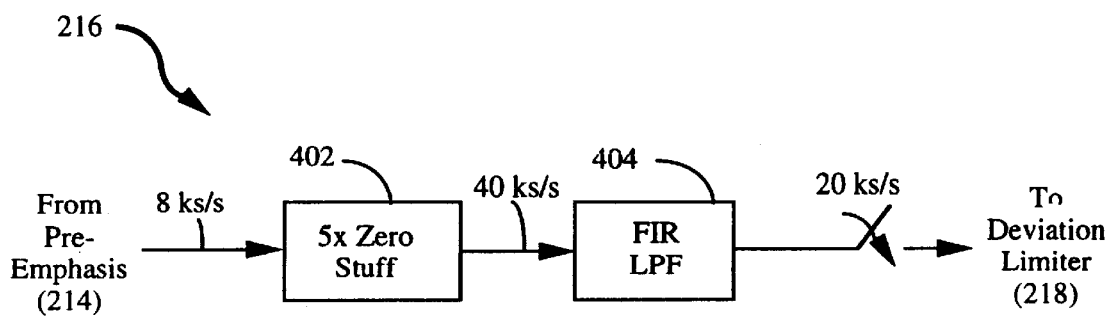
FIG. 4 is a logical block diagram of the transmit interpolator of the present invention.

Referring to FIG. 4, the non-integer interpolation ratio of 8 ks/s to 20 ks/s (2:5) is most efficiently implemented using an FIR M/N style interpolator 216. Interpolation proceeds by first up-sampling to 40 ks/s (5× zero-stuff interpolation 402) followed by low-pass (anti-alias) filtering 404 before down-sampling to 20 ks/s (2× decimation) as shown in FIG. 4. In operation, 5× zero-stuff interpolator 402 inserts data points corresponding to a value of zero into the input stream of 8 ks/s data Thus, for every 8 ks/s sample, four zero-data points are added to the data stream by 5× zero-stuff interpolator 402 to produce a 40 ks/s output signal. FIR low-pass filter 404 rejects the higher frequency images created by the 5× zero-stuff interpolator 402.

For efficient computation only the required 20 ks/s samples need be calculated, corresponding to a shift of 2 input samples per FIR filter 404 output. Also since ⅕ of the FIR filter 404 taps are zero due to the zero-stuff interpolation 402, only ⅕ of the taps need be calculated per output. Hence for an N-tap FIR filter 404 the number of multiply/accumulates is ⌈N/5⌉ per output. In the preferred embodiment, FIR low-pass filter 404 is a 30-tap FIR filter.

Referring again to FIG. 2, deviation limiter 218 limits the audio modulation to a maximum instantaneous frequency deviation of 12 kHz in order to prevent interference with neighboring frequency bands during RF transmission. The memory less transfer function of deviation limiter 218 is given by:

$$y[n] = \lambda \qquad \lambda < x[n]$$
$$y[n] = x[n] \quad -\lambda < x[n] < \lambda$$
$$y[n] = -\lambda \qquad x[n] < -\lambda$$

where the threshold λ sets the maximum deviation, equal to the threshold plus the worst case transmit overshoot due to the post-deviation filter 220, discussed below. In the preferred embodiment, the threshold λ is set to 8 kHz, limiting the maximum nominal deviation to 10.9 kHz and worst case deviation to less than 12 kHz given a 10% variation in modulation sensitivity.

Post-deviation filter 220 provides high frequency rejection of spurs generated by clipping in the deviation limiter 218 during signal excursions which exceed the limiter threshold. In the preferred embodiment, post-deviation filter 220 is a simple low-pass filter defined by the 3 kHz low-pass filter response and 35 dB of attenuation at the SAT frequency of 6 kHz. A exemplary implementation of post-deviation filter 220 is a 6th order butterworth, 3 dB frequency 3.15 kHz.

In response to the signal TX_MUTE, multiplexer 222 selectively provides either the post-deviation filtered signal or silence to summer 224 for combination with the regenerated SAT signal (discussed below), and eventual transmission over the air. TX_MUTE provides for muting of the transmit audio signal during wideband data signaling and provides for user features such as "mute" when privacy is desired without terminating the communication link. In the preferred embodiment, TX_MUTE is a bit that, when set, will cause the transmit signal to be muted within 3 ms.

Figure 6:
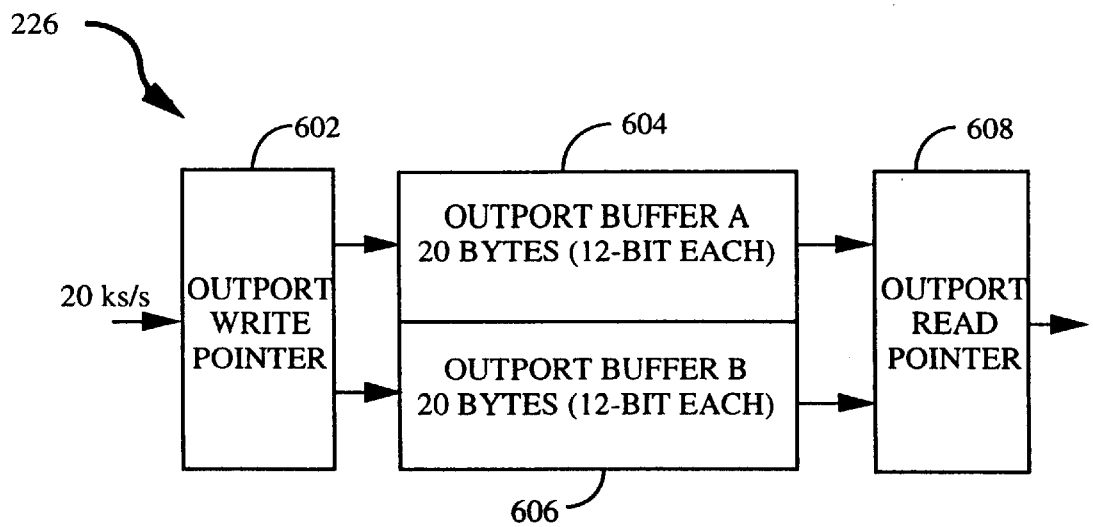
FIG. 6 is a logical block diagram of the transmit FIFO interface of the present invention.
Figure 7:
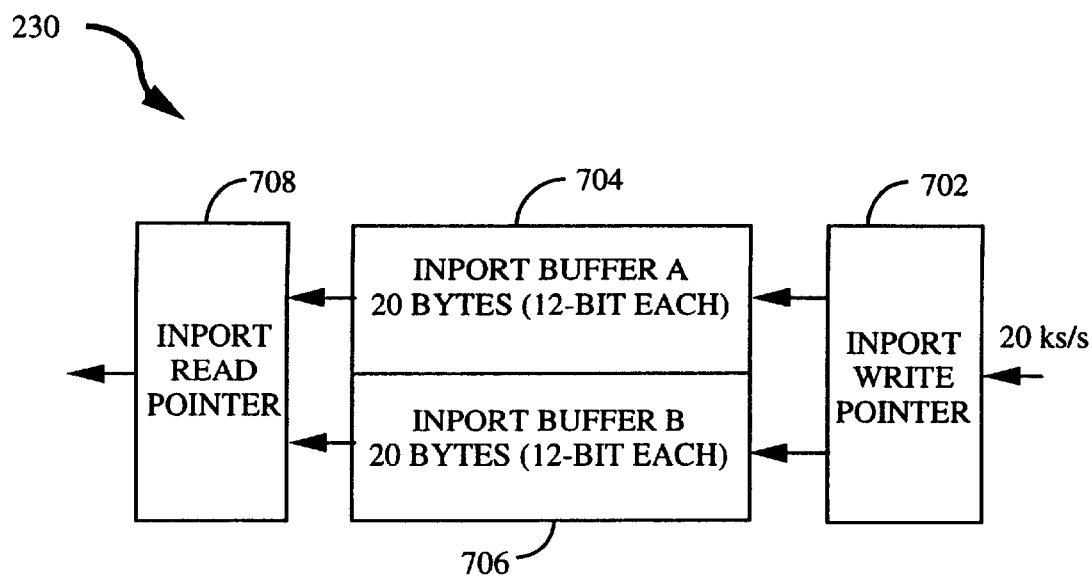
FIG. 7 is a logical block diagram of the receive FIFO interface of the present invention.

The summed audio/SAT signal output from summer 224 is passed to TX FM interpolator 112 (see FIG. 1) through TX FIFO interface 226 for up-sampling, modulation and transmission. Correlatively, the received, down-sampled, and demodulated digital FM audio is passed to 5:2 decimator 232 through RX FIFO interface 230. FIG. 6 illustrates the architecture of TX FIFO interface 226 and FIG. 7 illustrates the architecture of RX FIFO interface 230. In operation, TX FIFO interface 226 and RX FIFO interface 230 alternate writing and reading digital FM audio data to and from vocoder 120 (see FIG. 1, 2). TX data is first written to outport buffer A 604. After a predetermined number of samples are written to outport buffer A 604, then a corresponding predetermined number of RX data samples are read from inport buffer A 704. In the preferred embodiment, the predetermined number of samples is determined by the sample rate and may be either 20 samples or 5 samples. Then the process is repeated, except that TX data is written to outport buffer B 606, and RX data is read from inport buffer B 706. Read pointers 608, 708 and write pointers 602, 702 track which outport buffer 604, 606 and which inport buffer 704, 706 are currently being used.

III. FM RX Audio Processing

Referring again to FIG. 2, digital FM audio is passed from RX FIFO interface 230 to decimator 232 for down-sampling. In the preferred embodiment, the sample data is decimated from 20 ks/s to 8 ks/s in preparation for audio processing. Decimation of the sample rate from 20 ks/s to 8 ks/s is desired for audio band processing (computationally more efficient) and final output to the 8 ks/s CODEC 122 (see FIG. 1). In the preferred embodiment, the non-integer ratio (5:2) decimator 232 is efficiently implemented using an FIR M/N style decimator similar to that shown in FIG. 4. However, instead of a using 5× zero-stuff interpolation 402 and 20 ks/S final sampling rate (which results in 2:5 interpolation), 2× interpolation followed by a 8 ks/s final sampling rate is used to produce 5:2 decimation. Also, on the RX side, FIR low-pass filter 404 is preferably implemented as a 50-tap FIR filter, as opposed to the 30-tap FIR filter used in interpolator 216 (see FIG. 2) on the TX side. In the preferred embodiment, FIR low-pass filter 404 is tuned to place a zero at 6 kHz for added SAT rejection.

Referring again to FIG. 2, the decimated signal is band-limited by RX bandpass filter 234 in order to suppress high and low-frequency noise generated during demodulation, while preserving the audio frequency band. In the preferred embodiment, RX bandpass filter 234 is a 5th order high-pass filter (HPF) cascaded with a 3rd order LPF, with a combined bandwidth of 300 Hz to 3 kHz.

De-emphasis element 236 corrects for the pre-emphasis boost of the high frequencies as was discussed earlier with respect to pre-emphasis element 214. In the preferred embodiment, de-emphasis element 236 is a single pole low-pass IIR filter with a transfer function of:

$$H(z) = \frac{k}{(1 + a_1 z^{-1})}$$

where k=0.727937 and $a_1$=−0.88. This results in a −6dB/octave frequency response over the bandwidth 300 to 3 kHz. Similarly to pre-emphasis element 214, the nominal 0dB reference of de-emphasis element 236 is at 1 kHz.

Figure 5:
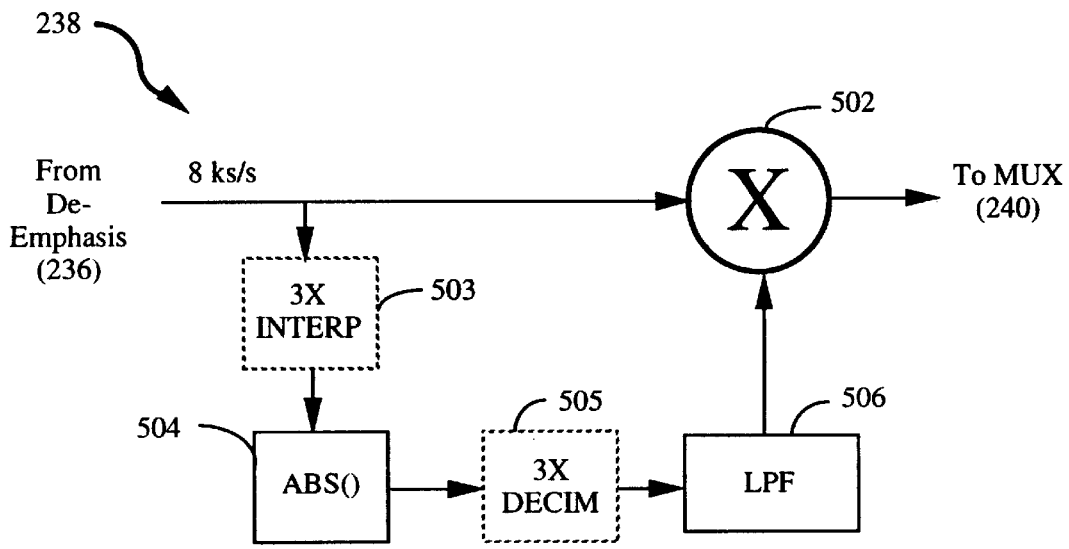
FIG. 5 is a logical block diagram of the receive expandor of the present invention.

As noted above with reference to compressor 210, an FM audio signal is typically compressed before it is transmitted in order to most efficiently use the available bandwidth. Thus, expandor 238 receives the de-emphasized, compressed digital FM audio signal and expands it to its original, full dynamic range. The preferred embodiment of expandor 238 is illustrated in FIG. 5. Expandor 238 comprises multiplier 502, absolute value calculator 504 and low-pass filter 506. In operation, absolute value calculator 504 measures the absolute value of the signal energy input to expandor 238, and generates a feed-forward signal which is low-pass filtered 506 and multiplied 502 into the input signal. The resultant expanded signal is then passed to multiplexer 240 (see FIG. 2). In the preferred embodiment, low-pass filter 506 is identical to low-pass filter 306 of compressor 210 (see FIG. 3). As with compressor 210 optional 3× interpolation 503 and 3×0 decimation 505 may be added to avoid phase dependent energy estimates in absolute value calculator 504.

Referring again to FIG. 2, multiplexer 240 operates similarly to multiplexer 222. In response to the signal AUTO_R_MUTE, multiplexer 240 selectively provides either the expanded digital FM audio signal, or silence to RX gain adjust element 242. Muting is performed during blank and burst messages, representing commands transmitted by the transmitting station, so that these messages are not converted to sound for the user to hear.

The expanded digital FM audio signal is then optionally gain adjusted by RX gain adjust element 242 for final calibration of the input level to CODEC 122 (see FIG. 1). In the preferred embodiment, RX gain adjust element 242 is a digital multiplier which provides −12 dB to +12 dB gain range settable via the FM_RX_GAIN signal. Also, as discussed above with reference to TX gain adjust element 206, RX gain adjust element 242 also provides RX gain adjustment for use with voice-activated (VOX) echo suppresser 250.

After RX gain adjust element 242, the received digital FM signal is provided to multiplexer 244, which operates similarly to multiplexer 212 on the transmit side. Multiplexer 244 selectively provides either the FM signal or DTMF side-tones to compensation filter 246, for eventual conversion to audio. In this way, a user may actually hear the DTMF tones as they are generated 252 for transmission to a tone-activated remote site.

Compensation filter 246 operates similarly to compensation filter 204 on the transmit side, provides optional equalization of the overall RX frequency response. In the preferred embodiment, compensation filter 246 is implemented identically to compensation filter 204.

Finally, a μ-law/a-law compressor 248 provides support for μ-law/a-law PCM CODECs 122 (FIG. 1). CODEC 122 may also be a linear CODEC, not using μ-law or a-law companding to limit the dynamic range of the audio input, in which case μ-law/a-law compressor 248 may be bypassed. The μ-law/a-law compressor 248 implements a complementary function to that of linear expander 202 described above.

IV. SAT Processing

Figure 8:
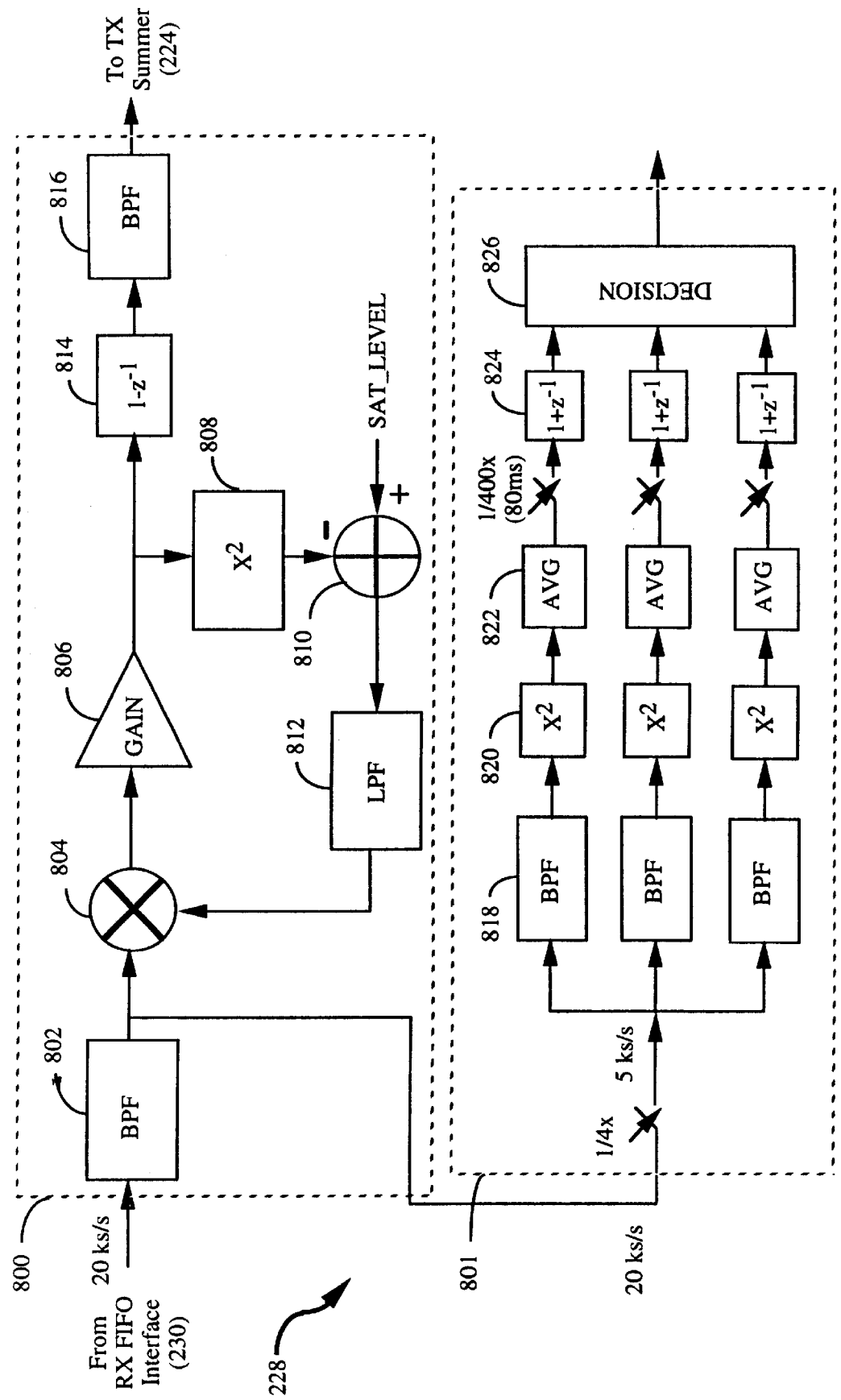
FIG. 8 is a logical block diagram of the SAT detector and transponder of the present invention.

Referring now to FIG. 8, the supervisory audio tone (SAT) processor 228 consists of SAT detector block 801 and SAT transponder block 800. SAT detection performed in SAT detector block 801 refers to determination of which of the three SAT frequencies is being received, whereas SAT transpond performed in SAT transponder block 800 consists of re-transmission of the received SAT frequency. As previously mentioned, the SAT signal is a tone of one of three nominal frequencies; namely, 5970 Hz, 6000 Hz or 6030 Hz. To maximize the detection signal SNR and reject audio band signals the FM demodulated signal is bandpass filtered in bandpass filter 802. In the preferred embodiment, bandpass filter 802 is a 100 Hz bandpass filter centered at 6kHz with audio band rejection of at least 60 dB.

The SAT detector block 801 is implemented efficiently by divide-by-four sub-sampling at 5 ks/s the bandpass signal centered at 6 kHz. As a result of sub-sampling to 5 ks/s the nominal SAT frequencies of 5970 Hz, 6000 Hz and 6030 Hz alias to 970 Hz, 1000 Hz and 1030 Hz, respectively. The received SAT signal is determined by estimating the signal energy over a predetermined interval within a predetermined detection window at each SAT frequency. According to IS-95 (see above) SAT detection is required to be performed every 250 ms. However, to minimize the latency between when SAT is initially applied/removed and when a valid/invalid SAT signal is detected, it is desirable to detect SAT at a higher rate. Thus, In the preferred embodiment, the predetermined detection interval is 160 ms, and the predetermined detection window is ±10 Hz.

This energy estimation occurs in three parallel filter banks, represented by bandpass filter 818, squarer 820, block averagor 822, and sliding block averagor 824. Each filter bank is designed to measure the energy of a different one of the three SAT frequencies. As such, each bandpass filter 818 in the preferred embodiment is a 2nd-order filter with a bandwidth of 20 Hz centered on one of the three SAT aliases (970 Hz, 1000 Hz and 1030 Hz). The sub-sampled 5 ks/s signal at each frequency is squared in squarer 820, and block averaged in block averagor 822 over 80 ms subintervals. A sliding-block average performed by sliding block averagor 824 of these partial estimates yields the final energy estimates over an averaging interval of 160 ms. Every 80 ms an initial SAT detection decision in decision element 826 is made by selecting the channel of maximum energy. The maximum energy is then compared against a threshold level above which a valid SAT signal is declared; otherwise no SAT is reported. In the preferred embodiment, the threshold is set at 6.0 dB with respect to the nominal SAT level, yielding a threshold greater than 5σ above the average worst case noise floor estimate, i.e. carrier to noise ratio (C/N) =−∞ (or no carrier). Hence false SAT detection in the absence of SAT is unlikely.

In SAT transponder block 800, the received SAT signal is summed in summer 224 (see FIG. 2) with the TX audio signal. Per IS95, the nominal transpond SAT level is 2 kHz ±10%. In order to meet the deviation specification of 2 kHz ±10%, the level of the filtered (filter 802) transponded signal is adjusted using an AGC loop represented by multiplier 804, amplifier 806, squarer 808, summer 810, and low-pass filter 812. The AGC loop adjusts for two sources of amplitude error; namely, the inherent deviation error of the received SAT signal and the band-limited additive noise which manifests itself as ~50Hz random amplitude modulation.

In operation, the transponded SAT signal is amplified by amplifier 806, squared by squarer 808, and subtracted in summer 810 from a desired SAT level. The difference is low-pass filtered in low-pass filter 812, and fed back to multiplier 804. In the preferred embodiment the transfer function of low-pass filter 812 is:

$$H(z) = \frac{K_s z^{-1}}{1 - z^{-1}}$$

where Ks represents the loop integrator gain. The AGC time constant (set by the loop integrator gain Ks) is a trade-off between tracking the AM modulation and distortion of the SAT signal. If the loop time is too fast, the AGC while track the SAT signal amplitude variations, resulting in 3rd harmonic distortion which folds back to 2 kHz within the TX audio bandwidth. In the preferred embodiment, the loop time constant is 500µs which corresponds to Ks=5. Also, in the preferred embodiment, amplifier 806 is a fixed gain of 4 (12 dB), resulting in an effective gain range of −∞ dB to 12 dB, and the gain of bandpass filter 802 is such that the nominal operating point is 0 dB. Limiting the maximum gain to 12 dB above the nominal set point is desirable to avoid excess amplification of the noise floor in the absence of SAT which will results in increased audio band cross-talk between RX and TX.

After amplification by amplifier 806, the transpond SAT signal is differentiated by differentiator 814. The $(1-z^{-1})$ differentiator 814 provides an additional 8 dB of harmonic rejection. Following differentiation, the transpond SAT signal is filtered by bandpass filter 816. In the preferred embodiment, bandpass filter 816 is centered at 1 kHz to provide 27 dB of rejection of the 2 kHz distortion component.

V. Voice Operated Switch (VOX) Echo Suppression

As discussed above with reference to TX gain adjust element 206, and RX gain adjust element 242, the FM VOX echo suppressor 250 is used to prevent the feedback resulting from the receive energy of a speaker (not shown) being fed back to a microphone (not shown) and becoming part of the amplified transmitted signal in a "hands free" or speakerphone mode of operation. Since this type of "echo" may occur in either the near-end or the far-end user, both the transmit and the receive energy of the portable phone (during hands-free mode only) must be monitored continuously.

Echo induced by feedback is suppressed by selectively attenuating the non-active path; for example, if the RX path is active the TX path is muted (attenuated). Echo suppressor 250 determines the activity level from a thresholded energy (absolute average) estimate. Calculation of the RX energy and TX energy estimates is avoided by using the absolute average loop filter outputs (from absolute value calculators 304 and 504; see FIGS. 3 and 5, respectively) of the compressor 210 and expandor 238, respectively. In the case concurrently active paths, priority is given to the far-end user, i.e. the RX path, and hence the TX path will be muted. As shown in FIG. 2, the TX/RX muting is implemented by scaling in the input of the compressor 210 using TX gain adjust element 206, and by scaling the output of expandor 238 using RX gain adjust element 242.

Figure 9:
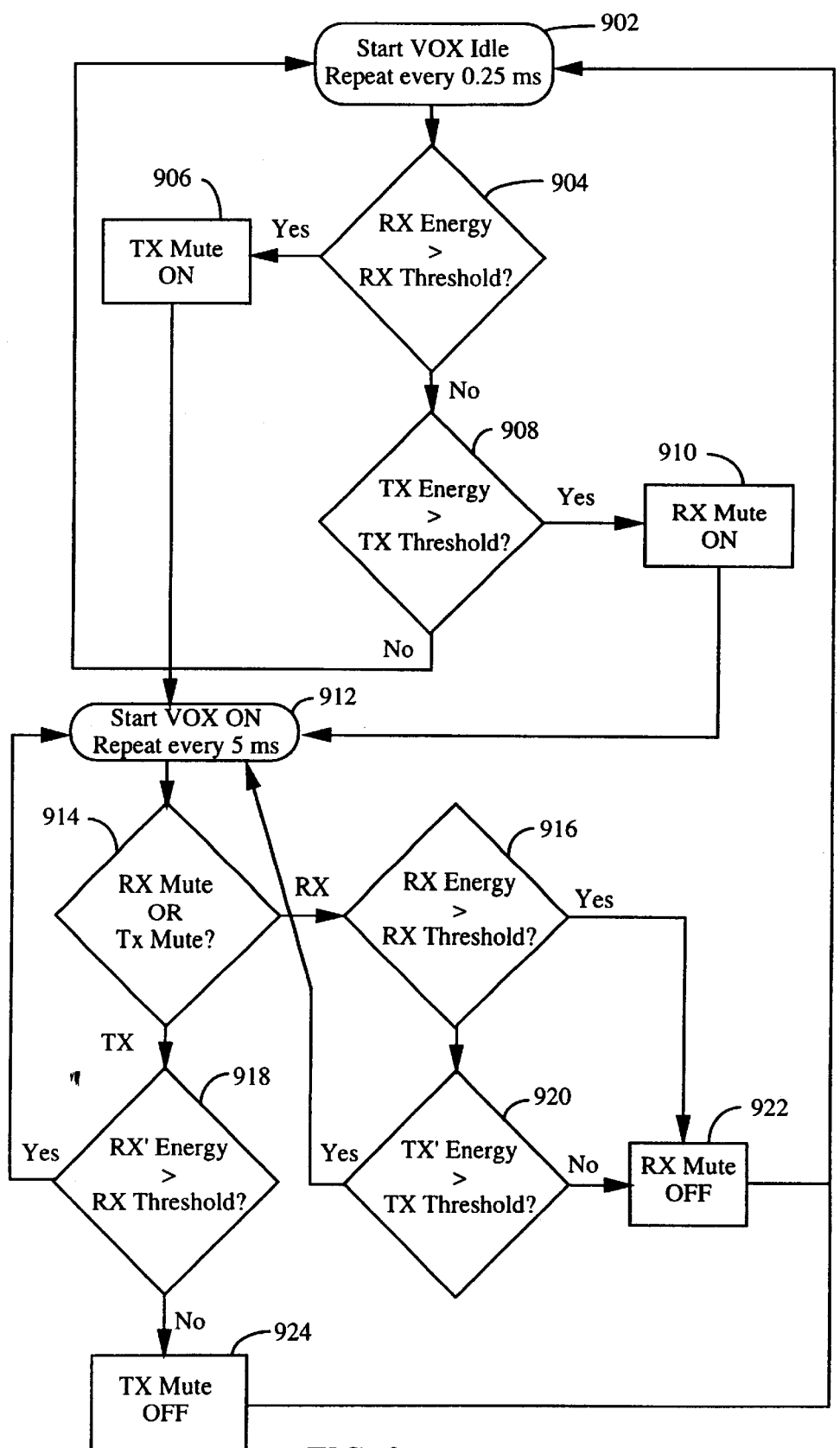
FIG. 9 is a diagram of the process of the VOX echo suppression of the present invention.

The flow-chart for the VOX algorithm is given in FIG. 9. The VOX algorithm has two decision states; namely, VOX Idle (block 902) for enabling mute and VOX On (block 912) for disabling mute. While neither the RX nor TX path are muted (VOX Idle state block 902), the VOX compares the RX and TX energy levels against their respective thresholds (blocks 904, 908) to determine if the other path should be muted (blocks 906, 910). If neither path should be muted, the VOX Idle state (block 902) is re-entered, and the process is repeated. In the preferred embodiment, the VOX Idle (block 902) process is repeated every 0.25 ms. Note the ordering of the tests ensures the RX threshold decision (block 904) has priority over the TX threshold decision (block 908). That is, if both paths are active TX mute (block 906) will be enabled.

Once either the TX or RX paths are muted (blocks 906, 910), the VOX enters VOX On state (block 912). In this state, the VOX continues to monitor the active path energy level, which upon falling below its threshold, results in disabling of the previous mute. For example, if the RX mute (block 910) has been activated (as determined by decision 914), the VOX determines (block 916) whether the RX energy has risen above the RX threshold. If so, RX mute is turned off (block 922), and the VOX returns to VOX Idle state (block 902). In order to ensure RX path priority when the RX path is muted (block 910), disabling of RX mute (block 922) also occurs if the TX path becomes inactive (block 920). With regard to the TX path, TX mute disabling (block 924) occurs if the RX path becomes inactive (block 920). Upon disabling of either the TX Mute (block 924) or the RX mute (block 922), the VOX re-enters the VOX Idle state (block 902). However, if the currently active path's energy level remains above its respective threshold (blocks 918, 920), no change is made and the VOX On state (block 912) is re-entered and repeated every 5 ms.

The attack time (idle to mute) of VOX echo suppressor 250 is set by the time constant of the loop and the chosen RX and TX threshold parameters. Extension of the decay time is achieved by further filtering of the primary energy estimates using a first 1st order IIR filter (not shown) internal to VOX echo suppressor 250 to generate the estimates RX' energy and TX' energy, which are compared against the decision thresholds 918, 920 to determine when the previously active path has become in-active.

The first 1st order IIR filter internal to VOX echo suppressor 250 operates only when a path has been muted. In the preferred embodiment, the IIR filter transfer function is:

$$H_1(z) = \frac{a_1}{1-(1-a_1)z^{-1}}$$

where $\alpha_1$ determines the loop time constant. In the preferred embodiment, the loop time constant is 200 ms.

In order to avoid instantaneous gain changes during transitions between mute and VOX idle 902, a second 1st order IIR filter (not shown) internal to the VOX echo suppressor 250 operates during the transition from TX mute off 924 or RX mute off 922 to VOX idle 902. This second 1st order IIR filter also serves to eliminate the toggling of volume when the audio level is near the VOX threshold. The transfer function of this second 1st order IIR filter is given by:

$$H_2(z) = \frac{a_2}{1-(1-a_2)z^{-1}}$$

where the value of $\alpha_2$ determines the smoothness of the transition between the transitions between mute and VOX idle 902.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A digital signal processor for use in a communication device which transmits and receives analog-modulated information signals when in an analog mode and which transmits and receives digitally-modulated information signals when in a digital mode, said digital signal processor comprising:
   a transmit audio processor for digitally processing an audio-band transmit signal when in said analog mode, wherein said transmit audio processor comprises:
      a compressor for digitally compressing said audio-band transmit signal, wherein said compressor comprises:
         an absolute value calculator for generating an absolute energy value signal in response to measuring an absolute energy value of said audio-band transmit signal;
         a digital filter, coupled to said absolute value calculator, for filtering said measured absolute energy value signal; and
         a divider, coupled to said absolute value calculator and said digital filter, for dividing said audio-band transmit signal by said digitally filtered, measured absolute energy value signal;
   a summer for digitally combining said compressed audio-band transmit signal with said regenerated supervisory audio tone
   a receive audio processor for digitally processing an audio-band receive signal when in said analog mode; and
   a supervisory audio tone processor, coupled to said receive audio processor and said transmit audio processor, for digitally detecting and transponding a supervisory audio tone.

2. The digital signal processor of claim 1 wherein compressor further comprises:
   an interpolator, coupled to an input of said absolute value calculator, for increasing a data rate of said audio-band transmit signal; and
   a decimator, coupled to an output of said absolute value calculator, for decreasing a data rate of said measured absolute energy value signal.

3. A digital signal processor for use in a communication device which transmits and receives analog-modulated information signals when in an analog mode and which transmits and receives digitally-modulated information signals when in a digital mode, said digital signal processor comprising:
   a transmit audio processor for digitally processing an audio-band transmit signal when in said analog mode, wherein said transmit audio processor comprises:
      a compressor for digitally compressing said audio-band transmit signal;
      a summer for digitally combining said compressed audio-band transmit signal with said regenerated supervisory audio tone; and
   an interpolator coupled to said compressor and said summer and interposed therebetween, said interpolator for increasing a data rate of said compressed audio-band transmit signal, wherein said interpolator comprises:
      a data inserter for inserting extra data points into said compressed audio-band transmit signal;
      a filter for removing aliases introduced into said compressed audio-band transmit signal by said data inserter; and
      a sampler, for sampling said filtered, compressed audio-band transmit signal;
   a receive audio processor for digitally processing an audio-band receive signal when in said analog mode; and
   a supervisory audio tone processor, coupled to said receive audio processor and said transmit audio processor, for digitally detecting and transponding a supervisory audio tone.

4. A digital signal processor for use in a communication device which transmits and receives analog-modulated information signals when in an analog mode and which transmits and receives digitally-modulated information signals when in a digital mode, said digital signal processor comprising:
   a transmit audio processor for digitally processing an audio-band transmit signal when in said analog mode, wherein said transmit audio processor comprises:
      a compressor for digitally compressing said audio-band transmit signal; and
      a summer for digitally combining said compressed audio-band transmit signal with said regenerated supervisory audio tone;
   a receive audio processor for digitally processing an audio-band receive signal when in said analog mode;
   a supervisory audio tone processor, coupled to said receive audio processor and said transmit audio processor, for digitally detecting and transponding a supervisory audio tone;
   a dual-tone multi-frequency (DTMF) generator for generating digitally-encoded DTMF tones and a DTMF control signal; and a multiplexer, coupled to said DTMF generator and said compressor, for alternately providing said compressed audio-band transmit signal and said digitally-encoded DTMF tones to said summer in response to said DTMF control signal.

5. A digital signal processor for use in a communication device which transmits and receives analog-modulated information signals when in an analog mode and which transmits and receives digitally-modulated information signals when in a digital mode, said digital signal processor comprising:
- a transmit audio processor for digitally processing an audio-band transmit signal when in said analog mode, wherein said transmit audio processor comprises:
  - a compressor for digitally compressing said audio-band transmit signal; and
  - a summer for digitally combining said compressed audio-band transmit signal with said regenerated supervisory audio tone;
- a receive audio processor for digitally processing an audio-band receive signal when in said analog mode;
- a supervisory audio tone processor, coupled to said receive audio processor and said transmit audio processor, for digitally detecting and transponding a supervisory audio tone; and
- an echo suppressor, coupled to said compressor, for generating an attenuation signal in response to an absolute energy value of said audio-band transmit signal; and
- a transmit gain adjust element, coupled to said echo suppressor and said compressor, for attenuating said audio-band transmit signal in response to said attenuation signal.

6. A digital signal processor for use in a communication device which transmits and receives analog-modulated information signals when in an analog mode and which transmits and receives digitally-modulated information signals when in a digital mode, said digital signal processor comprising:
- a transmit audio processor for digitally processing an audio-band transmit signal when in said analog mode, wherein said transmit audio processor comprises:
  - a compressor for digitally compressing said audio-band transmit signal; and
  - a summer for digitally combining said compressed audio-band transmit signal with said regenerated supervisory audio tone;
- a receive audio processor for digitally processing an audio-band receive signal when in said analog mode, wherein said receive audio processor comprises an expander for de-compressing said audio band receive signal, and wherein said expander comprises:
  - an absolute value calculator for generating an absolute energy value signal in response to measuring an absolute energy value of said audio-band receive signal;
  - a digital filter, coupled to said absolute value calculator, for filtering said measured absolute energy value signal; and
  - a multiplier, coupled to said absolute value calculator and said digital filter, for multiplying said audio-band receive signal by said digitally filtered, measured absolute energy value signal; and
- a supervisory audio tone processor, coupled to said receive audio processor and said transmit audio processor, for digitally detecting and transponding a supervisory audio tone.

7. The digital signal processor of claim 6 wherein expander further comprises:
- an interpolator, coupled to an input of said absolute value calculator, for increasing a data rate of said audio-band receive signal; and
- a decimator, coupled to an output of said absolute value calculator, for decreasing a data rate of said measured absolute energy value signal.

8. A digital signal processor for use in a communication device which transmits and receives analog-modulated information signals when in an analog mode and which transmits and receives digitally-modulated information signals when in a digital mode, said digital signal processor comprising:
- a transmit audio processor for digitally processing an audio-band transmit signal when in said analog mode, wherein said transmit audio processor comprises:
  - a compressor for digitally compressing said audio-band transmit signal; and
  - a summer for digitally combining said compressed audio-band transmit signal with said regenerated supervisory audio tone;
- a receive audio processor for digitally processing an audio-band receive signal when in said analog mode, wherein said receive audio processor comprises an expander for de-compressing said audio band receive signal; and
- a supervisory audio tone processor, coupled to said receive audio processor and said transmit audio processor, for digitally detecting and transponding a supervisory audio tone; and
- a dual-tone multi-frequency (DTMF) generator for generating digitally-encoded DTMF tones and a DTMF control signal;
- a multiplexer, coupled to said DTMF generator and said expander, for alternately providing said expanded audio-band receive signal and said digitally-encoded DTMF tones at an output of said multiplexer in response to said DTMF control signal.

9. A digital signal processor for use in a communication device which transmits and receives analog-modulated information signals when in an analog mode and which transmits and receives digitally-modulated information signals when in a digital mode, said digital signal processor comprising:
- a transmit audio processor for digitally processing an audio-band transmit signal when in said analog mode wherein said transmit audio processor comprises:
  - a compressor for digitally compressing said audio-band transmit signal; and
  - a summer for digitally combining said compressed audio-band transmit signal with said regenerated supervisory audio tone;
- a receive audio processor for digitally processing an audio-band receive signal when in said analog mode, wherein said receive audio processor comprises an expander for de-compressing said audio band receive signal; and a supervisory audio tone processor, coupled to said receive audio processor and said transmit audio processor, for digitally detecting and transponding a supervisory audio tone;
- an echo suppressor, coupled to said expander, for generating an attenuation signal in response to an absolute energy value of said audio-band receive signal; and
- a receive gain adjust element, coupled to said echo suppressor and said expander, for attenuating said audio-band receive signal in response to said attenuation signal.

10. A digital signal processor for use in a communication device which transmits and receives analog-modulated information signals when in an analog mode and which transmits and receives digitally-modulated information signals when in a digital mode, said digital signal processor comprising:
- a transmit audio processor for digitally processing an audio-band transmit signal when in said analog mode;
- a receive audio processor for digitally processing an audio-band receive signal when in said analog mode; and
- a supervisory audio tone processor, coupled to said receive audio processor and said transmit audio processor, for digitally detecting and transponding a supervisory audio tone, wherein said supervisory audio tone processor comprises:
  - a supervisory audio tone detector for determining a frequency of said supervisory audio tone; and
  - a supervisory audio tone transponder for regenerating said supervisory audio tone, wherein said supervisory audio tone detector comprises:
    - a plurality of parallel filter banks, each filter bank for measuring an energy value of a different one of a plurality of supervisory audio tone frequencies; and
    - a decision element for selecting a maximum measured energy value from said plurality of measured energy values.

11. The digital signal processor of claim 10 wherein each of said plurality of filter banks comprises:
- a squarer for squaring said supervisory audio tone; and
- a block averager, coupled to said squarer, for averaging said squared supervisory audio tone.

12. A digital signal processor for use in a communication device which transmits and receives analog-modulated information signals when in an analog mode and which transmits and receives digitally-modulated information signals when in a digital mode, said digital signal processor comprising:
- a transmit audio processor for digitally processing an audio-band transmit signal when in said analog mode;
- a receive audio processor for digitally processing an audio-band receive signal when in said analog mode; and
- a supervisory audio tone processor, coupled to said receive audio processor and said transmit audio processor, for digitally detecting and transponding a supervisory audio tone, wherein said supervisory audio tone processor comprises:
  - a supervisory audio tone detector for determining a frequency of said supervisory audio tone; and
- a supervisory audio tone transponder for regenerating said supervisory audio tone, wherein said supervisory audio tone transponder comprises:
  - a supervisory audio tone summer for summing said supervisory audio tone with said compressed transmit audio signal;
  - an automatic gain control loop, coupled to said supervisory audio tone summer, for controlling a gain of said summed supervisory audio tone and compressed transmit audio signal; and
  - a differentiator, coupled to said automatic gain control loop, for differentiating said gain controlled, summed supervisory audio tone and compressed transmit audio signal.

* * * * *